(12) United States Patent
Chen et al.

(10) Patent No.: US 8,596,287 B1
(45) Date of Patent: Dec. 3, 2013

(54) CROSS FLOW TANK

(75) Inventors: Chaoyuan C. Chen, San Jose, CA (US); Bing-Shiuan Chang, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 680 days.

(21) Appl. No.: 12/715,276

(22) Filed: Mar. 1, 2010

(51) Int. Cl.
*B08B 3/04* (2006.01)

(52) U.S. Cl.
USPC .......................................... 134/182; 134/201

(58) Field of Classification Search
USPC .................. 134/182, 201; 210/221.2
See application file for complete search history.

(56) References Cited

U.S. PATENT DOCUMENTS

| | | | |
|---|---|---|---|
| 3,895,449 A * | 7/1975 | Chance et al. | 34/638 |
| 4,375,992 A | 3/1983 | Stevens et al. | |
| 5,485,861 A | 1/1996 | Hiratsuka et al. | |
| 5,516,433 A * | 5/1996 | Suutarinen | 210/703 |
| 5,518,450 A * | 5/1996 | Paveliev | 454/187 |
| 5,579,792 A | 12/1996 | Stanasolovich et al. | |
| 6,220,259 B1 | 4/2001 | Brown et al. | |
| 2009/0283158 A1 | 11/2009 | Miller et al. | |

* cited by examiner

*Primary Examiner* — Michael Kornakov
*Assistant Examiner* — Douglas Lee

(57) ABSTRACT

A cleaning tank apparatus and methods for cleaning workpieces are described. The cleaning tank may include an outlet plate having a top edge and a bottom edge, with the outlet plate having a plurality of rows of outlet openings. The plurality of rows of outlet openings including a first row of outlet openings being closest to the top edge of the outlet plate, and a second row of outlet openings below the first row of outlet openings, wherein at least one of the outlet openings of the first row is larger than the outlet openings of the second row.

12 Claims, 7 Drawing Sheets

|   | Outlet Opening Diameter (inch) | | | |
|---|---|---|---|---|
| Q (LPM) | 1st Row | 2nd Row | 3rd Row | 4th Row |
| 30 | 0.75 | 0.75 | 0.75 | 0.75 |
| 40 | 0.87 | 0.75 | 0.75 | 0.75 |
| 50 | 0.97 | 0.75 | 0.75 | 0.75 |
| 60 | 1.06 | 0.75 | 0.75 | 0.75 |
| 70 | 1.15 | 0.75 | 0.75 | 0.75 |
| 80 | 1.22 | 0.75 | 0.75 | 0.75 |
| 90 | 1.30 | 0.75 | 0.75 | 0.75 |
| 100 | 1.37 | 0.75 | 0.75 | 0.75 |
| 110 | 1.44 | 0.75 | 0.75 | 0.75 |
| 120 | 1.50 | 0.75 | 0.75 | 0.75 |

FIG. 6

CROSS FLOW TANK

TECHNICAL FIELD

Embodiments described herein relate to the field of cleaning processes, more particularly, to the cleaning of workpieces.

BACKGROUND

During a series of magnetic recording disk manufacturing operations, a disk's surface is exposed to various types of contaminants. Any material present in a manufacturing operation is a potential source of contamination. For example, sources of contamination may include process gases, chemicals, deposition materials, and liquids. The various contaminants may be deposited on the disk's surface in particulate form. If the particulate contamination is not removed, it may interfere with the proper fabrication of a magnetic recording disk. Therefore, it is necessary to clean contamination from the surface of the disk after one or more stages in the manufacturing process, such as post sputtering.

Contamination may be removed using a sonication technique where a disk is submerged in a cleaning tank containing a cleaning liquid in order to remove a majority of the particles from the disk's surface. A cross flow of the cleaning liquid is established in the cleaning tank in order to remove loose particles from a vicinity of the disk. The relative strength between the cross flow and acoustic stream generated by the sonication determines two cleaning performance metrics: (1) contaminant particle removal efficiency, and (2) contaminant particle re-deposition (i.e., on the disk) rate.

FIG. 1A illustrates a conventional cleaning tank which is designed with 16 circular outlet openings that are configured to establish an outgoing flow of liquid. The 16 outlet openings are divided into four rows, which each row having four outlet openings. The outgoing flow rate in each outlet opening may be adjusted using a manual valve. FIG. 1B shows the dimensions of a conventional cleaning tank outlet plate. Each of the outlet openings of the outlet plate are 0.75 inches (in) in diameter, corresponding to an opening area of approximately 1.77 square inches (in$^2$). The outlet plate has a width of 17 inches and a length of 13 inches. A centerline running through the lowest, fourth row of outlet openings is spaced 2.5 inches from the bottom edge of the outlet plate. A centerline running through the third row of outlet openings is spaced 5 inches from the bottom edge of the outlet plate. A centerline running through the second row of outlet openings is spaced 7.5 inches from the bottom edge of the outlet plate. A centerline running through the first row of outlet openings is spaced 10 inches from the bottom edge of the outlet plate. Accordingly, there is distance of 2.5 inches between each of the rows of outlet openings, with the centerline of top most, first row being spaced 3 inches from the top edge of outlet plate.

Referring again to FIG. 1A, the size of each of the outlet openings affects the cross tunnel flow in the laminar flow regime. If the outlet openings are too small, most of the incoming flow would hit the outlet plate and create bounce back flow turbulence. If the outlet openings are too large, most of the incoming flow would not follow the desired laminar stream flow. Rather, most of the flow would follow the pressure term in the Bernoulli flow dynamics. One problem with the conventional cleaning tank illustrated in FIG. 1A is that it may not be able to handle high cross flow rates. Conventional cleaning tanks are designed to operate with a cross flow rate in a range of 15 to 30 liters per minute (LPM). If the incoming flow through the inlet plate were to be increased above the 30 LPM limit, the extra incoming flow would result in overflow out of the cleaning tank as illustrated by the chart of FIG. 2. As such, conventional cleaning tanks as currently designed would not be able to handle higher incoming flow rates.

BRIEF DESCRIPTION OF THE DRAWINGS

Embodiments are illustrated by way of example, and not limitation, in the figures of the accompanying drawings in which:

FIG. 6 is a chart illustrates outlet opening sizes for different cross flow rates according embodiments of the present invention.

DETAILED DESCRIPTION

Embodiments of the apparatus and methods are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known manufacturing processes and equipment have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

Embodiments of a cleaning tank and methods of operation are described. Although embodiments of cleaning tank may be described with respect to sonication cleaning, the cleaning tank may also be used with cleaning operations that do involve sonication (e.g., a rinse operation). In one embodiment, the cleaning methods described herein may be utilized for post sputter wet cleaning (PSC) of magnetic recording disks. Alternatively, the cleaning methods described herein may be used in other pre or post fabrication operation cleans of partially or fully fabricated magnetic recording disks. Although embodiments of the present invention may, at times, be described in relation to magnetic recording disks, it should be appreciated that the present invention may also be used for the cleaning of semiconductor wafers or other types of workpieces. The term "workpiece" as used herein may include, substrates, semiconductor wafers, photomasks, magnetic recording disks, optical discs, glass substrates, flat panel display surfaces, liquid crystal display surfaces, etc.

Figure 1A:
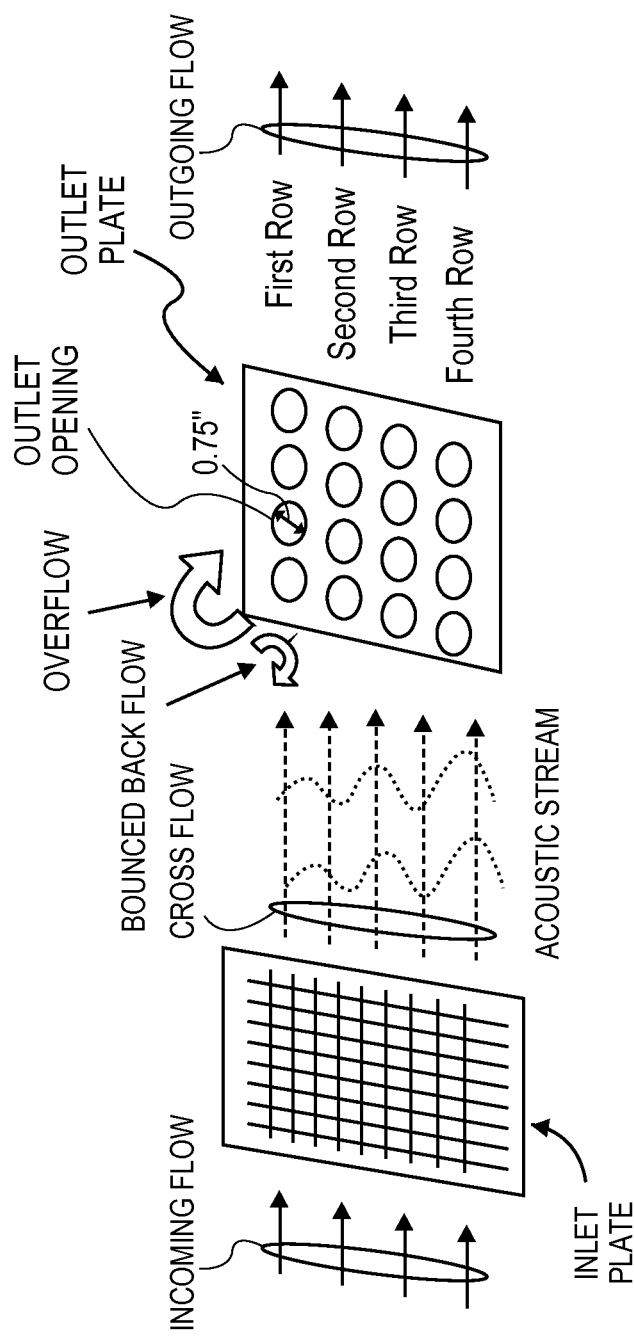
FIGS. 1A and 1B illustrate a conventional cleaning tank.
Figure 1B:
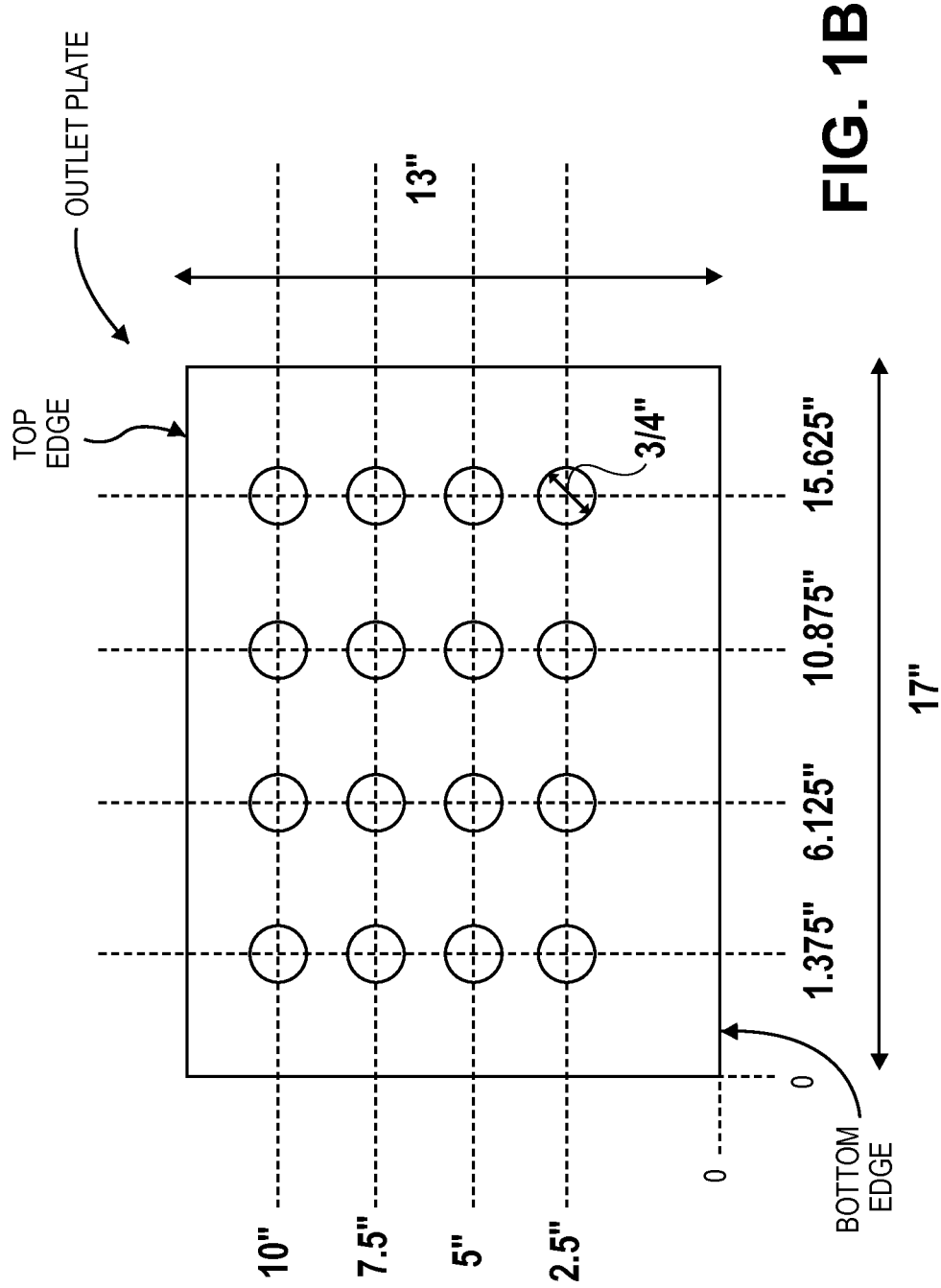
Figure 2:
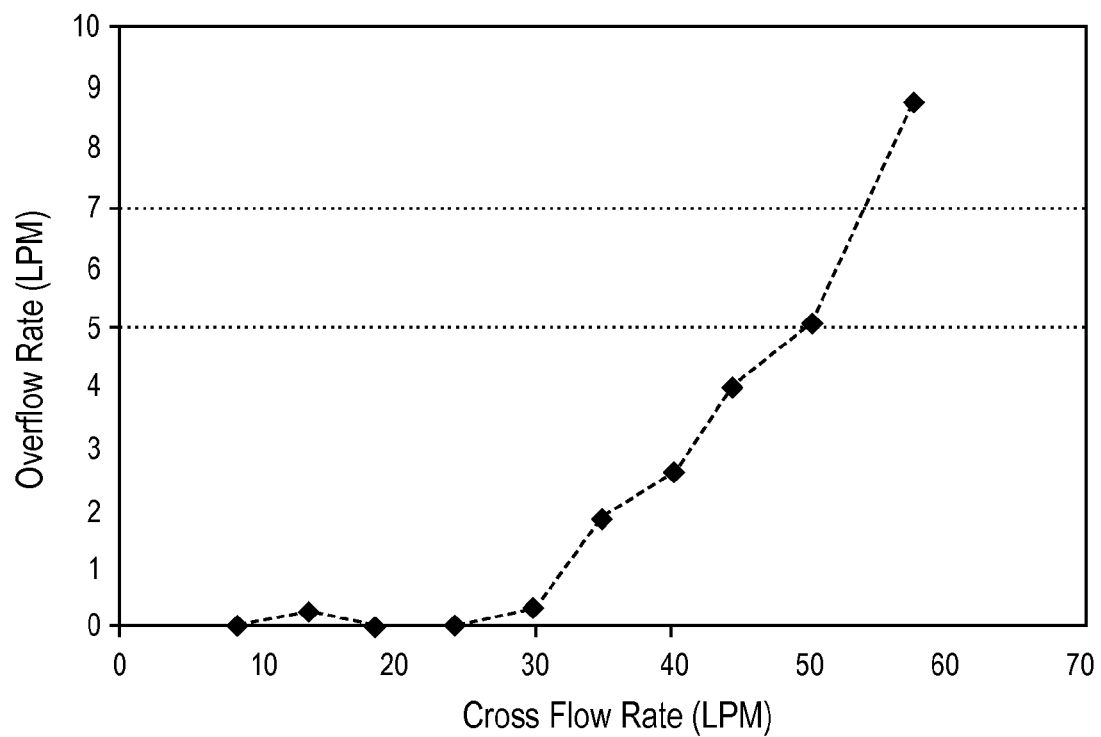
FIG. 2 is a chart illustrating the effect of increasing cross flow rate on the overflow rate of a conventional cleaning tank.
Figure 3:
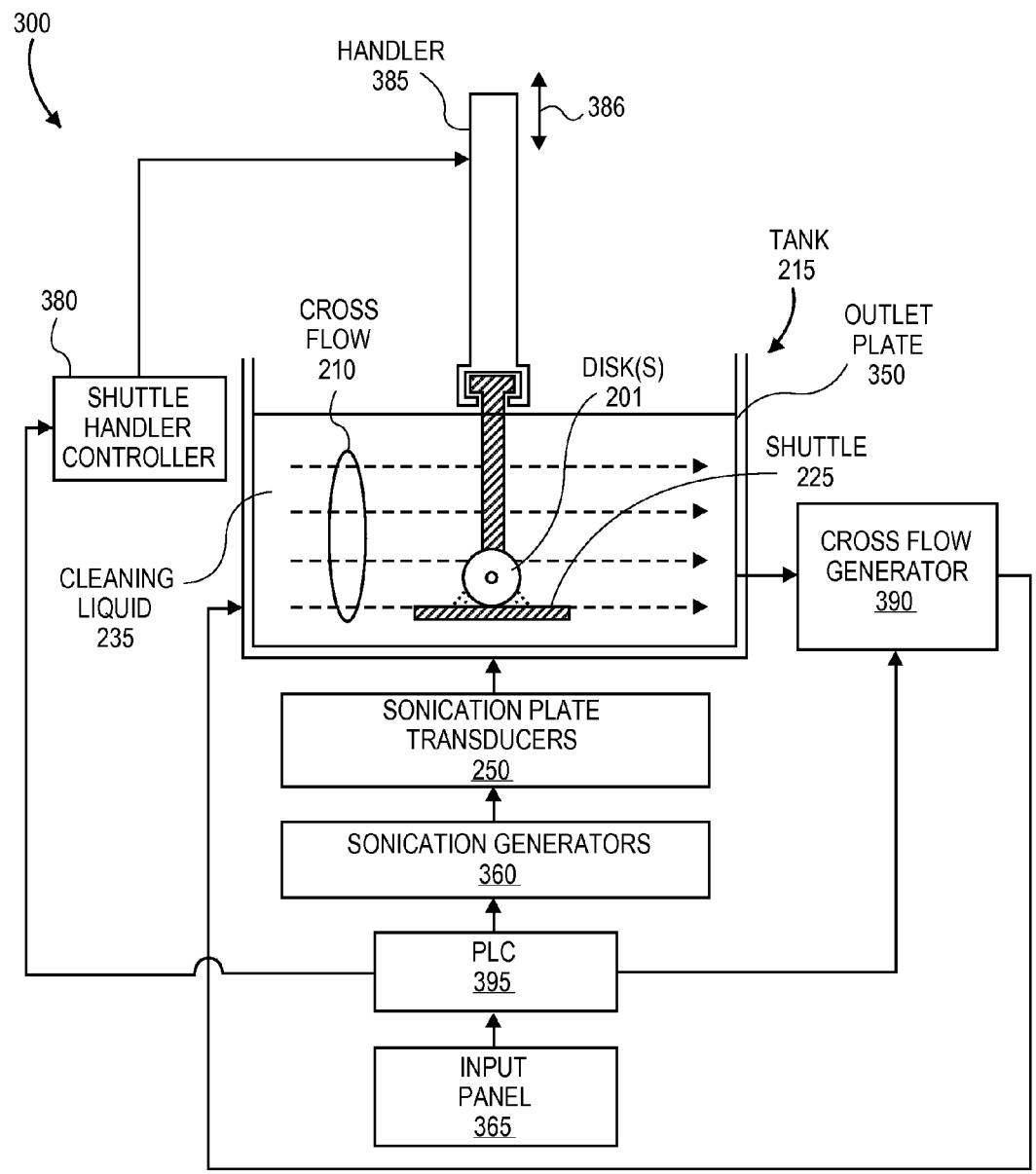
FIG. 3 is a block diagram illustrating a cleaning control system according to one embodiment of the present invention.

FIG. 3 is a block diagram illustrating a cleaning control system 300 according to one embodiment of the present invention. As depicted, a system controller, such as programmable logic controller (PLC) 395 is used to control the operation of the various subsystem controllers, generators, and components. The PLC 395 is coupled to sonication generator 360 to control the operation (e.g., power settings and frequencies) of sonication plate transducers 250 through a user input panel 365. A user may program the PLC 395, through input panel 365, with a particular power setting for a particular stage of the cleaning operations discussed above. The sonication plate transducers 250, under control of PLC 395, generate an acoustic stream in the cleaning liquid 235 of tank 215.

The cleaning control system 300 also includes a shuttle handler controller 380 coupled to handler 385 which, in turn, is coupled to a shuttle 225 carrying disk(s) 201. The shuttle handler controller 380 controls the submersion and removal 386 of disk(s) into tank 215 and the transfer of the shuttle 225 to and from other tanks. The shuttle handler controller 380 also controls the oscillation 260 of the disk(s) 201 on shuttle 225 during either sonication or rinse cleaning operations. A user may program the PLC 395, through input panel 365, to control the oscillation of the shuttle handler controller 380 in coordination with the power settings and frequencies for the sonication generators 360. The cleaning control system 300 also includes a cross flow generator 390 to generate a cross flow 210 of cleaning liquid 235 within tank 215. The cross flow generator 390 includes components to generate cross flow 210, for example, a pump to drive the cross flow of cleaning liquid and one or more valves to control the rate of cross flow 210. In one embodiment, the cleaning control system 300 may be operated to generate a cross flow 210 of cleaning liquid 235 in cleaning tank 215 to remove particles from a vicinity of the disk(s) 210 in the cleaning tank, where the cross flow 210 has a rate in at least a range of 30 to 50 liters per minute and the cleaning liquid is outflowed through outlet plate 350 at predetermined outflow rate to maintain an overflow rate of cleaning liquid below 5 liters per minute. In other embodiments, the generation of a cross flow rate may be in excess of 50 liters per minute. Shuttle handler controllers, cross flow generators, PLCs, sonication generators and sonication plate transducers are known to those of ordinary skill in the art and are commercially available; accordingly, further details are not provided herein.

The design of cleaning tank 215 enables the generation of cross flows at rates higher than possible with conventional cleaning tanks. More specifically, cleaning tank 215 includes an outlet plate 350 that is designed to establish laminar cross flow 210 at a desired higher rate. Too great of a cross flow 210 turbulence in tank 215 may affect the operation of the cleaning control system 300. A turbulent flow keeps loose particles in the cleaning tank 215 longer and worsens particle redeposition. In addition, particles that are removed from disk(s) 201, which are then loose particles, may return to the same disk(s) 201 or subsequent disks placed in the cleaning tank 215. Where sonication is used in the cleaning process, another effect is the impact on the sonication strength. The sonication cleaning efficiency is determined by the relative flow strength between the acoustic stream of the sonication flow and the cross flow 210. Too high a cross flow turbulence can unbalanced the flow strengths and, thus, degrade the sonication cleaning efficiency, resulting in less particle removal from the disk(s) 201.

The outlet plate 350 of the present invention is designed achieve the higher cross flow rates (e.g., greater than 30 LPM) than are possible with outlet plates of conventional cleaning tanks by minimizing the amount of overflow that would otherwise be associated with such conventional designs. In one particular embodiment, the outlet plate 350 may be designed to accommodate cross flow rates in excess of 60 LPM as may be required to achieve a faster sonication process throughput while still maintaining desired particle removal efficiency and particle redeposition rate. The design of the outlet plate 350 is discussed in further detail below in regards to FIGS. 4 and 5. For ease of explanation, the outlet openings are illustrated and discussed as circular in shape and having a corresponding diameter dimension. It should be noted that the outlet openings may have other shapes (square, oval, etc.) and other corresponding dimensions.

Figure 4:
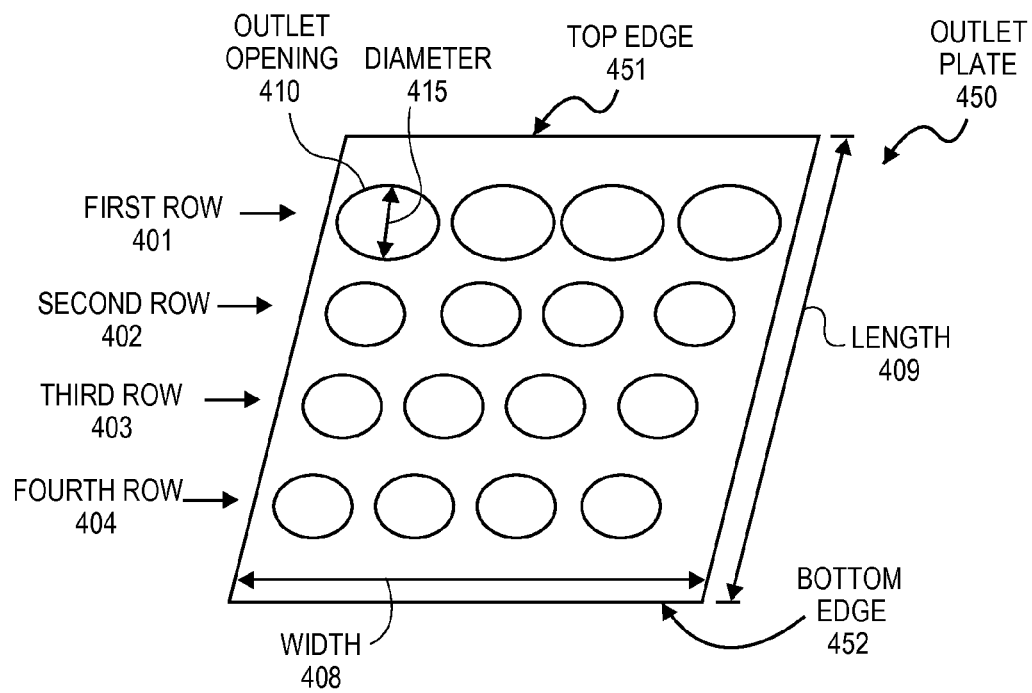
FIG. 4 illustrates an outlet plate of a cleaning tank according to one embodiment of the present invention.

FIG. 4 illustrates a outlet plate of a cleaning tank according to one embodiment of the present invention. Outlet plate 450 is one embodiment of outlet plate that may be used for outlet plate 350 of FIG. 3. In this embodiment, outlet plate 450 has four rows of outlet openings: a first row of outlet openings 401; a second row of outlet openings 402, a third row of outlet openings 403, and a fourth row of outlet openings 404. Each of the rows of outlet openings has four outlet openings (e.g., outlet opening 410 in first row 401). Alternatively, the outlet plate 450 may have more or less than four rows of outlet openings and more or less than four outlet openings in any particular row.

In this embodiment, the size of the outlet openings in the first, top most row 401 is increased as compared with the openings in a conventional outlet plate. In an embodiment where the outlet openings are circular in shape as illustrated in FIG. 4, the diameters (e.g., diameter 415) of one or more of the outlet openings (e.g., outlet opening 410) in the first row 410 are greater than 0.75 inches, with corresponding areas larger than approximately 1.77 square inches (in$^2$). In one embodiment, at least one of the outlet openings (e.g., 410) of the first row 401 is at least 15 percentage larger than a size of the outlet openings of the other rows 402-404. Since the outgoing flow of the top, first row 401 is closer to the top edge 451 of the outlet plate 450, an increase in the size of the first row outlet openings allows for an increase in the cross flow rate without significantly increasing the overflow and bounce back flow in cleaning tank 215. Accordingly, outlet plate 450 may be utilized with cross flow rates in excess of 30 LPM. In one embodiment, the outlet plate 450 has a width 408 of 17 inches and a length 409 of 13 inches. Alternatively, the outlet plate 450 may have other shapes and dimensions.

Figure 5:
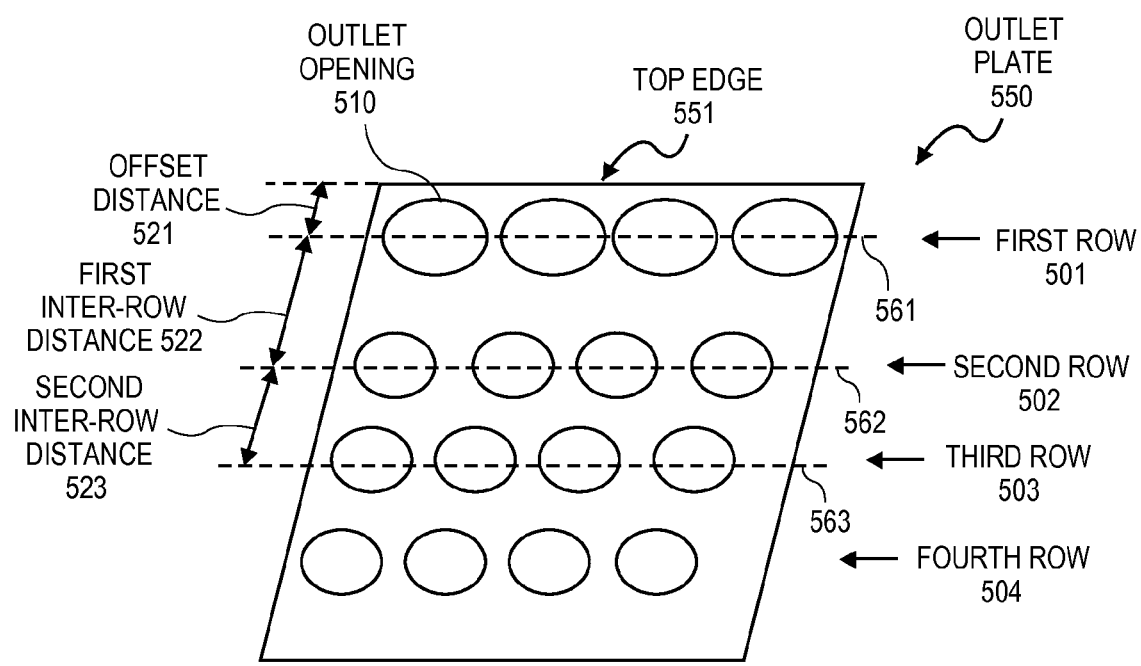
FIG. 5 illustrates an outlet plate of a cleaning tank according to another embodiment of the present invention.

FIG. 5 illustrates a outlet plate of a cleaning tank according to another embodiment of the present invention. Outlet plate 550 is one embodiment of outlet plate that may be used for outlet plate 350 of FIG. 3. Outlet plate 550 may have similar dimensions as outlet plate 450 of FIG. 4 including four rows of outlet openings: a first row of outlet openings 501; a second row of outlet openings 502, a third row of outlet openings 503, and a fourth row of outlet openings 504. Each of the rows of outlet openings has four outlet openings (e.g., outlet opening 510 in first row 501). Alternatively, the outlet plate 550 may have more or less than four rows of outlet openings and more or less than four outlet openings in any particular row.

However, in this embodiment, the first, top most row 501 is offset from the other rows 502-504 to be situated closer to the top edge 551 of outlet plate 550. Such a design may help minimize the overflow turbulence in cleaning tank 215 when the cleaning control system 300 is operated with higher cross flow rates as discussed above. More specifically, a first inter-row distance 522 between a centerline 561 of the first row 501 and a centerline 562 of the second row 502 is greater than a second inter-row distance 523 between the centerline 562 of the second row 502 and a centerline 563 of the third row 503. Although a longer distance between the first row 501 and the second row 502 may degrade laminar flow, the reduction of overflow at high cross flow rates with such a configuration provides a greater overall benefit to the system than any drawbacks from degraded laminar flow strength.

In one embodiment, the first inter-row distance 522 is greater than 2.5 inches. In one particular embodiment, the first inter-row distance is approximately 3.5 inches. In another embodiment, the offset distance 521 is less than 2.5 inches away from the top edge 551 of the outlet plate 550. In one particular embodiment, the offset distance 521 is approximately 1.5 inches.

In the embodiment of the outlet plate 550 illustrated in FIG. 5, the offset distance 521 between the top edge of the outlet plate and the center line 561 of the first row 501 is less than either inter-row distances 522 or 523.

The size of the outlet openings (e.g., outlet opening 510) of the first row 501 may also be larger than those of rows 502-504 as discussed above in regards to the outlet plate 450 embodiment of FIG. 4. Alternatively, the size of the outlet openings of the first row 501 may be the same as the outlet openings of rows 502-504.

FIG. 6 is a chart illustrates outlet opening sizes for different cross flow rates according to embodiments of the present invention. As discussed above, using the outlet plate embodiments discussed in regards to FIGS. 4 and 5, the size of the outlet openings in the first row of the outlet plate 350 may be increased in order to accommodate higher rates of cross flow 210. The chart of FIG. 6 provides exemplary minimum diameters (in inches) for the outlet openings in the various rows for a particular cross flow rate Q (in LPM). It should be noted that the diameters provided in the chart may be varied by +/−10 percent.

In one embodiment, at least one of the outlet openings of the first row (e.g., row 401 or row 501) may be set to have a diameter, in inches, within +/−0.25 inches of a value equal to seventy five percent of a square root of an incoming flow rate into the cleaning tank 215 divided by an outgoing flow rate through the outlet plate 350.

Although these embodiments have been described in language specific to structural features and methodological acts, it is to be understood that the invention defined in the appended claims is not necessarily limited to the specific features or acts described in particular embodiments. The specific features and acts disclosed are to be understood as particularly graceful implementations of the claimed invention in an effort to illustrate rather than limit the present invention.

What is claimed is:

1. A cleaning tank, comprising:
   an outlet plate having a top edge and a bottom edge, wherein the outlet plate is a side plate of the cleaning tank, the outlet plate comprising a plurality of rows of outlet openings, wherein the plurality of rows comprise:
   a first row of outlet openings being closest to the top edge of the outlet plate;
   a second row of outlet openings below the first row of outlet openings, wherein at least one of the outlet openings of the first row is larger than the outlet openings of the second row, wherein an offset distance between the top edge of the outlet plate and a center line of the first row is less than an inter-row distance between respective centerlines of the first and second rows.

2. The cleaning tank of claim 1, wherein the at least one of the outlet openings of the first row is approximately circular having a diameter being greater than 0.75 inches.

3. The cleaning tank of claim 2, wherein the at least one of the outlet openings of the first row at least 15 percentage larger than the outlet openings of the second row.

4. The cleaning tank of claim 1, wherein the at least one of the outlet openings of the first row is approximately circular having a diameter, and where the diameter, in inches is within +/−0.25 inches of a value equal to seventy five percent of a square root of an incoming flow rate into the cleaning tank divided by an outgoing flow rate through the outlet plate.

5. The cleaning tank of claim 1, wherein the plurality of rows further comprises:
   a third row of outlet openings below the second row of outlet openings; and
   a fourth row of outlet openings below the third row of outlet openings, wherein a first inter-row distance between respective centerlines of the first and second rows is greater than a second inter-row distance between respective centerlines of the second and third rows.

6. The cleaning tank of claim 5, wherein the first inter-row distance is greater than 2.5 inches.

7. The cleaning tank of claim 5, wherein the first inter-row distance is approximately 3.5 inches.

8. The cleaning tank of claim 1, wherein a centerline through a center of each the outlet openings of the first row is a distance being less than 2.5 inches away from the top edge of the outlet plate.

9. The cleaning tank of claim 8, wherein the distance is approximately 1.5 inches.

10. The cleaning tank of claim 1, wherein all of the outlet openings of the first row are larger than the outlet openings of the second row.

11. The cleaning tank of claim 1, wherein the first row has four outlet openings, each being larger than the outlet openings in other ones of the plurality of rows.

12. The cleaning tank of claim 1, wherein the at least one of the outlet openings of the first row has an area larger than approximately 1.77 square inches (in$^2$).

* * * * *